E. M. HEYLMAN.
ENGINE GANG PLOW.
APPLICATION FILED NOV. 4, 1912.
1,192,197.
Patented July 25, 1916.
6 SHEETS—SHEET 6.
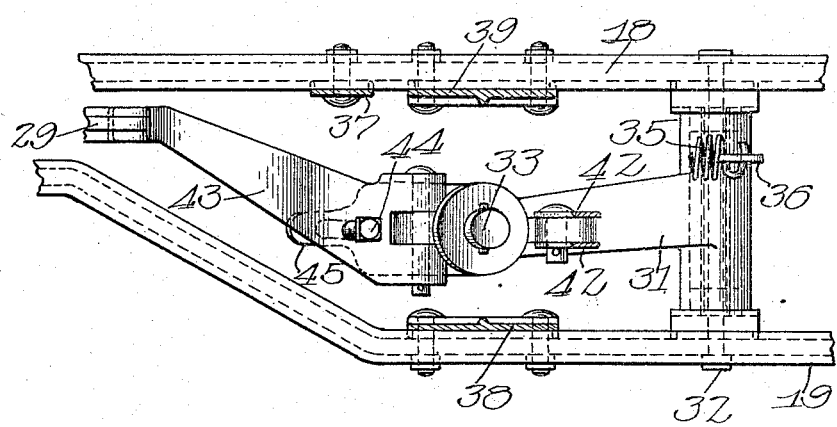
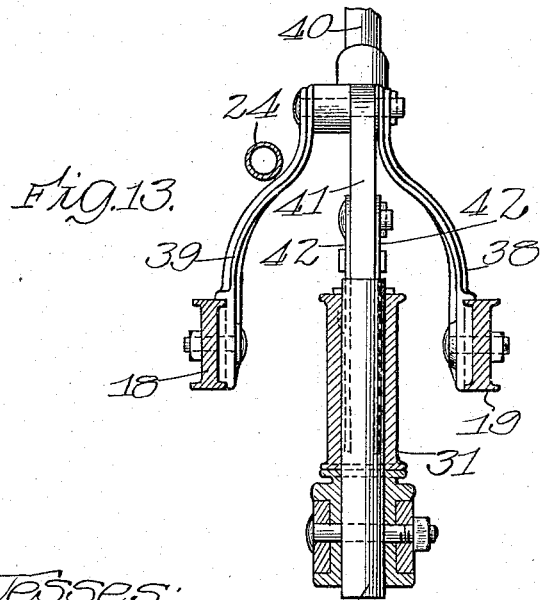

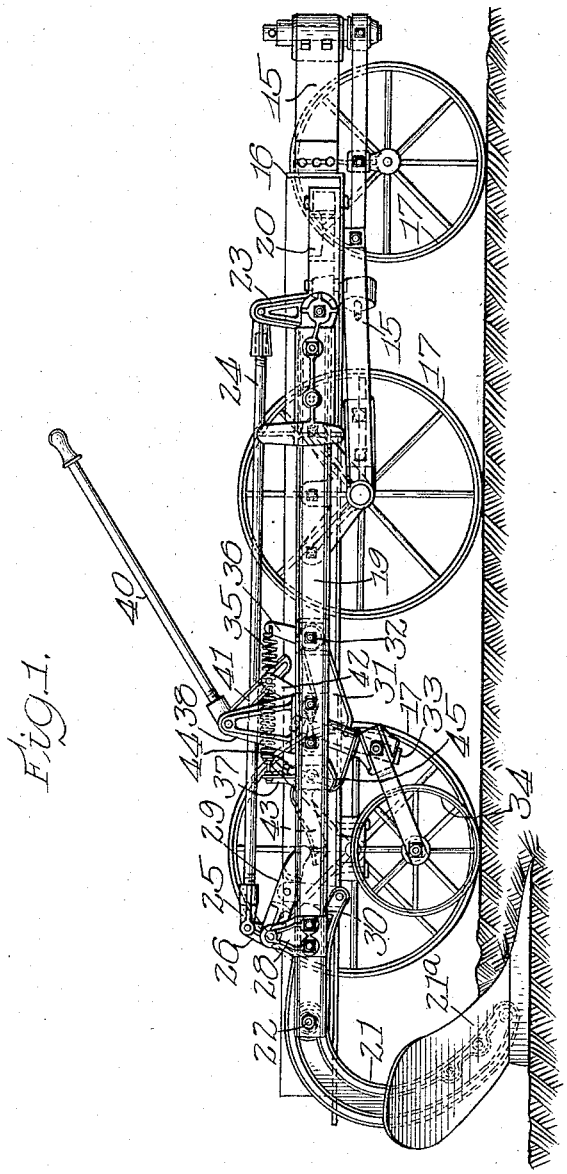

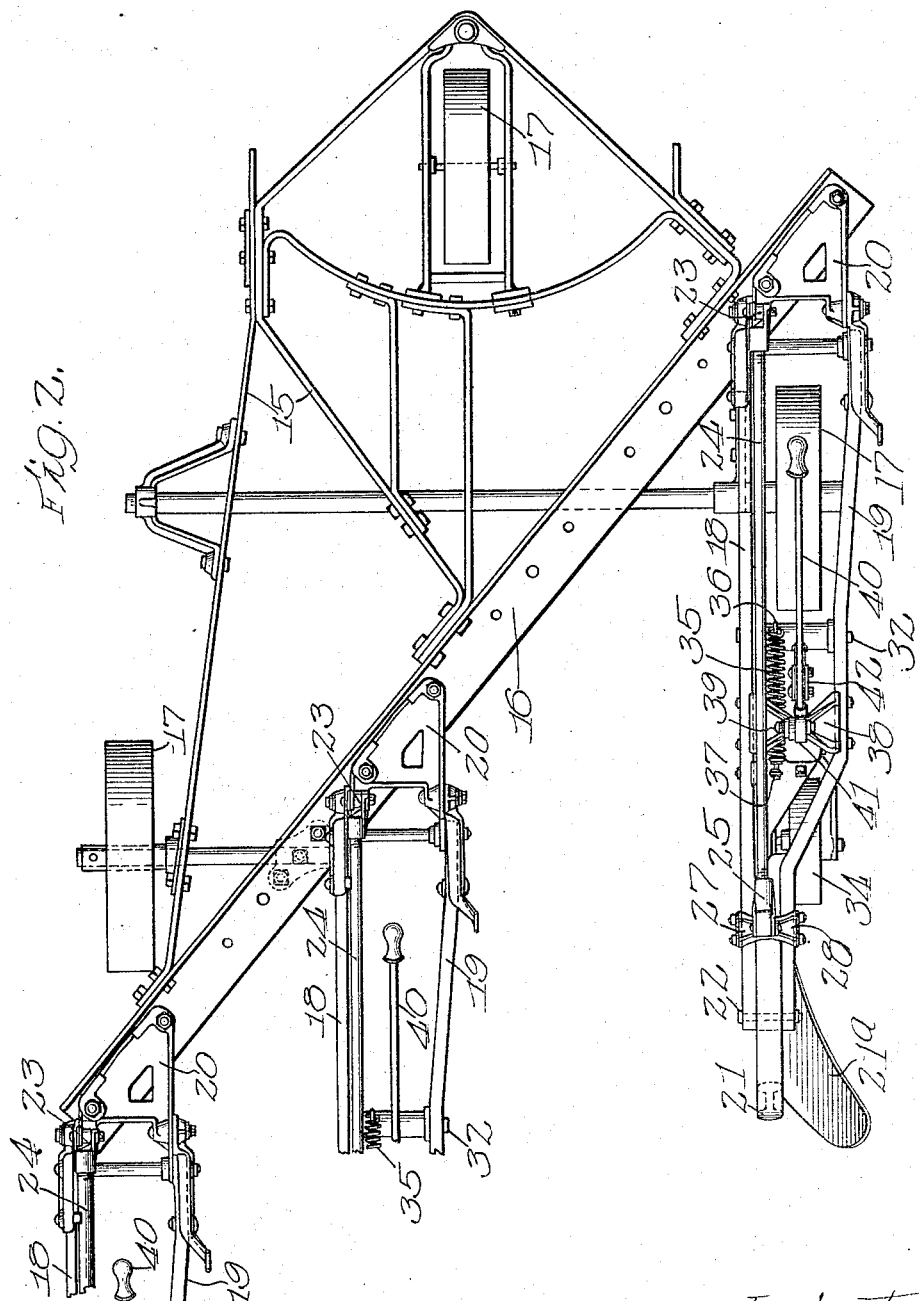

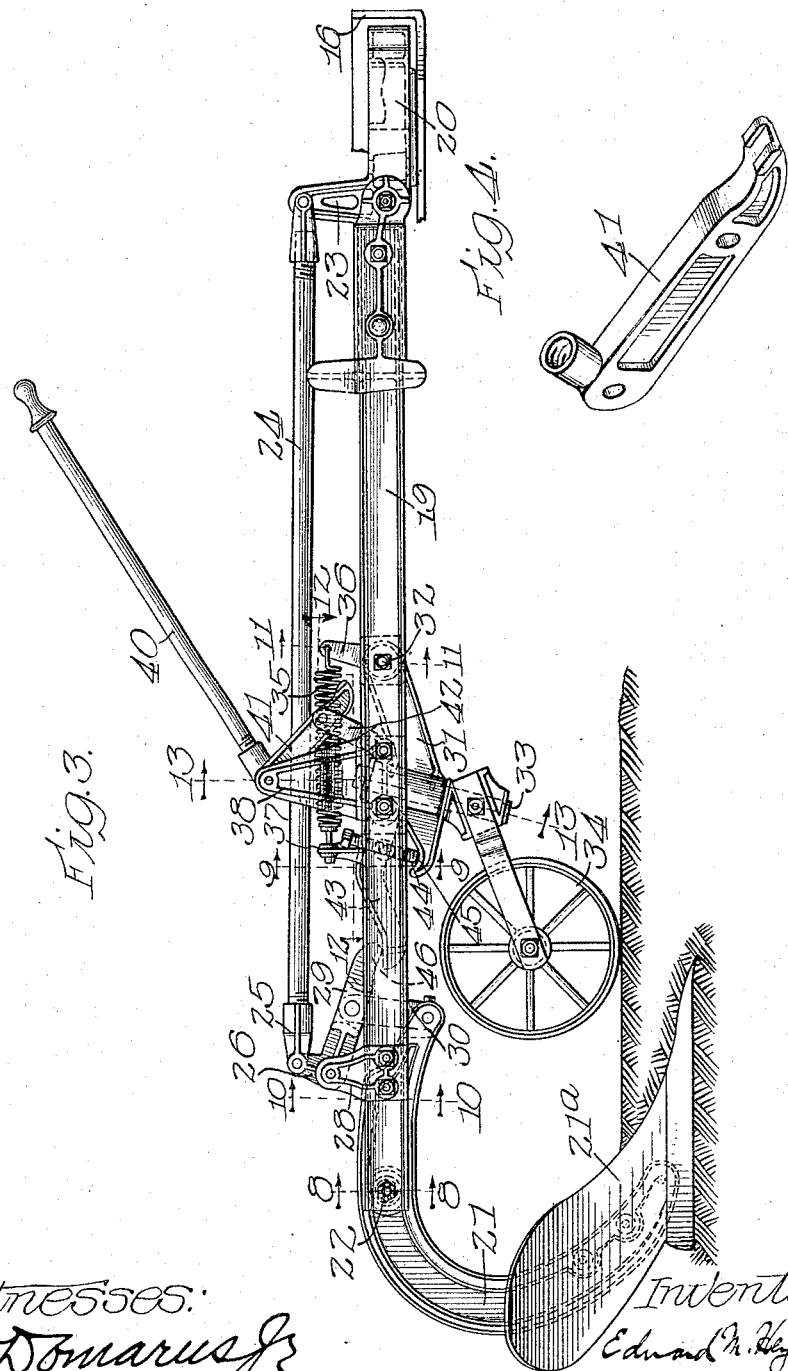

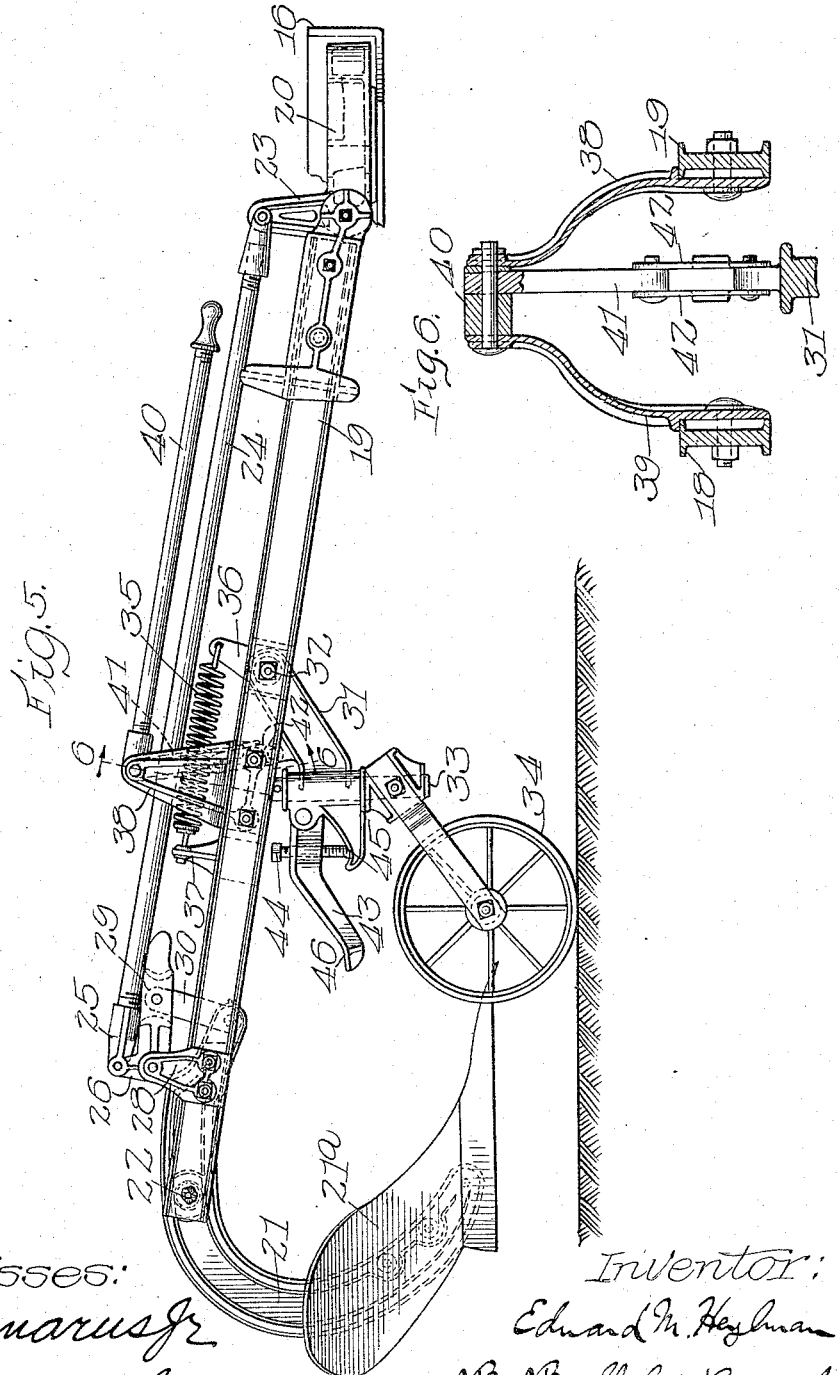

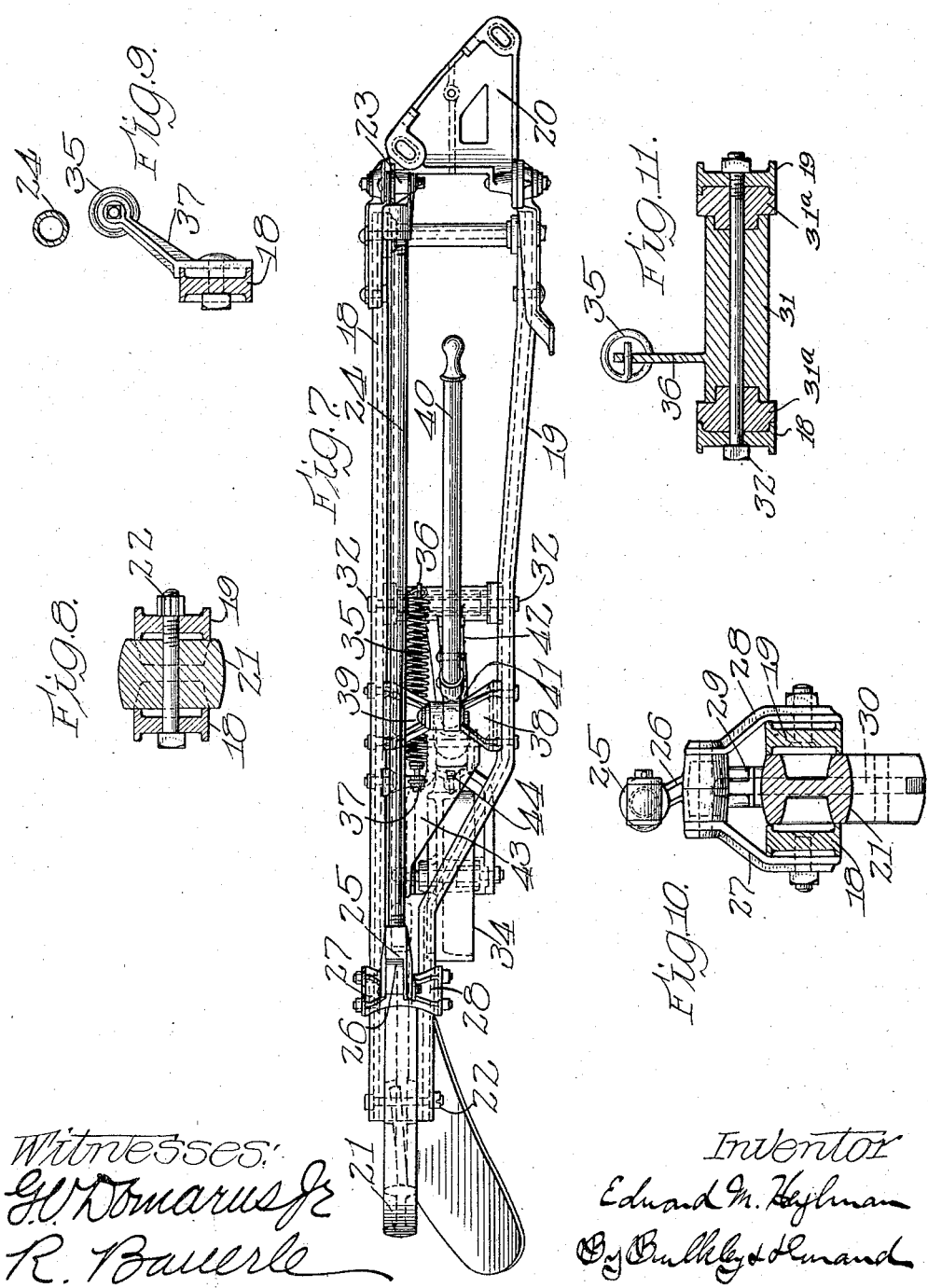

UNITED STATES PATENT OFFICE.

EDWARD M. HEYLMAN, OF ROCK ISLAND, ILLINOIS, ASSIGNOR TO ROCK ISLAND PLOW COMPANY, OF ROCK ISLAND, ILLINOIS, A CORPORATION OF ILLINOIS.

ENGINE GANG-PLOW.

1,192,197.      Specification of Letters Patent.     Patented July 25, 1916.

Application filed November 4, 1912. Serial No. 729,313.

*To all whom it may concern:*

Be it known that I, EDWARD M. HEYLMAN, a citizen of the United States of America, and resident of Rock Island, Rock Island county, Illinois, have invented a certain new and useful Improvement in Engine Gang-Plows, of which the following is a specification.

My invention relates to improvements in engine gang plows—that is, to a gang plow which is adapted to be drawn by an engine attached to the front of the frame.

The objects of my invention are to improve the general construction of this form of plow and to provide an improved mechanism for adjusting the plow body to varying depths of the furrow. Heretofore, in plows of this construction in which the plow beam is pivoted at its forward end, difficulty has been experienced in that in adjusting the plow beam vertically, the plow body would not be maintained in the same angular position with respect to the ground, and, therefore, the suction of the plow would vary depending upon the vertical adjustment of the same. I have provided means for adjusting the plow whereby the plow is always maintained in the same parallel relation with respect to the ground and thus the same suction of the plow is obtained. I likewise provide means whereby this parallel movement of the plow body is maintained while the plow body is moved upward or downward by the unevenness of the ground. Thus as the plow is drawn across the field and the gage-wheel rides along the uneven surface of the ground, thus raising and lowering the plow, the heel and toe of the plow body are always raised and lowered to the same extent, and thus the same suction of the plow is maintained irrespective of the curvature or unevenness of the ground. I, furthermore, provide improved means for locking the plow in raised position.

A further novel feature of my invention is the means for adjusting the depth of the suction of the plow body, which means comprises an adjusting screw for each plow body and means whereby when the raising lever is released the plow body will fall back to the desired adjusted position.

These and other objects of my invention will be more readily understood by having reference to the accompanying drawings in which I have illustrated one embodiment of my invention.

Throughout the drawings similar reference characters refer to similar parts.

Figure 1 represents a side elevation of a gang embodying the features of my invention. Fig. 2 is a plan view of the same. Fig. 3 is a side elevation of a single plow beam and plow body, together with the mechanism associated therewith for operating the same. Fig. 4 is a detail view. Fig. 5 is a view similar to Fig. 3, but showing the plow beam in its raised position. Fig. 6 is a sectional view taken on line 6—6 of Fig. 5. Fig. 7 is a plan view of Fig. 3. Fig. 8 is a sectional view taken on line 8—8 of Fig. 3. Fig. 9 is a sectional view taken on line 9—9 of Fig. 3. Fig. 10 is a sectional view taken on line 10—10 of Fig. 3. Fig. 11 is a sectional view taken on line 11—11 of Fig. 3. Fig. 12 is a sectional view taken on line 12—12 of Fig. 3. Fig. 13 is a sectional view taken on line 13—13 of Fig. 3.

In Figs. 1 and 2 I have illustrated diagrammatically the manner in which a plurality of plow beams are associated together in an engine gang plow. As represented, there is provided a suitable frame 15, to which is secured the inclined rear bar 16 to which the various plow beams are secured. Mounted in this frame 15 are the land wheels 17. This frame can be of any desired construction, and as the same comprises no part of my present invention, it is not thought necessary to show or describe the same more in detail. Of course, it is understood that in an engine gang the engine for driving the gangs is usually attached in front of this frame, but in order to avoid unnecessary complications in the drawings, I have omitted all reference to this engine from the same.

The novel feature of my invention consists in the particular construction and arrangement of the parts which are applied to each of the several plow beams. As clearly shown in Figs. 2 and 7, these plow beams are preferably double—that is, comprise the two members 18 and 19. These members are secured together at their forward ends by the triangular-shaped casting 20 to which they are pivotally connected and by which means they are secured to the bar 16. The curved member or plow standard 21, which carries the plow body 21ª, is pivotally mounted between the rear ends of these members 18 and 19, being pivotally connected thereto by means of the bolt 22.

Secured to the casting 20 there is an upwardly extending bracket 23, to which the connecting rod 24 is pivotally connected. The rear end of this connecting rod 24 is threaded into the socket 25 which is pivotally connected to one arm 26 of a bell crank. This bell crank is pivotally mounted between the brackets 27 and 28 carried by the two members 18 and 19. The other arm 29 of the bell crank extends substantially at right angles to the arm 26, and pivotally connected to this arm 29 there is a link 30 which, at its opposite end, is connected to the forward end of the curved member 21.

A casting 31 is pivotally mounted on the blocks 31ª mounted between the members 18 and 19 by means of the bolt 32, which casting carries the standard 33 of the gage-wheel 34. A balance spring 35 to assist in raising the plow is connected to the ear 36 secured to the casting 31, and the ear 37 mounted on the member 18. A pair of triangular-shaped brackets 38 and 39 are mounted upon the members 18 and 19, and pivotally mounted in the upper end of these brackets is the raising lever 40. Extending substantially at right angles to this raising lever and rigidly connected thereto, there is a arm 41 pivoted to a link 42, the lower end of which second link is connected to the casting 31. Pivoted to this casting 31 there is a curved arm 43 which is provided with a flat end portion 46 which is adapted to engage the finger-shaped end of the arm 29 of the bell crank. The position of this arm 43 is adjusted by means of the screw bolt 44, the lower end of which bolt bears against the curved socket 45 provided on the casting 31.

Having now given a general description of the construction and arrangement of the various parts of the gang, I will describe the operation of these parts when the plow body is raised and lowered, and the manner in which these parts operate when the plow body is adjusted to cut furrows of various depths. Starting with the parts in the position shown in Fig. 3, in order to raise the plow body from the ground, it is merely necessary to press downwardly upon the raising lever 40, which operates through the medium of the arms 41 and 42 to press downwardly upon the casting 31 and thus upon the gage-wheel 34, and this operates to raise the plow beam and plow body into the position shown in Fig. 5. It will be noticed that when the parts are in this position the arms 41 and 42 have been moved slightly past dead center, and in this manner the plow is locked in raised position. When it is desired to lower the plow, it is merely necessary to pull up on the raising lever 40, which breaks this locking connection and permits the plow beam to move downward into the ground until the finger end of bell-crank arm 29 strikes the portion 46 of the curved arm 43. Further downward movement of the plow is prevented on account of the engagement between the finger portion 46 of the bell crank arm 29 and the arm 43. It will be noticed that in this downward movement of the plow body the same is always maintained in the same angular relation to the ground line. This is accomplished by means of the relation of the connections consisting of the members 18 and 19 and the rod 24.

If special provision was not provided, it would be evident that when the plow beam was swung downward that the heel of the plow would move into the ground at a more rapid rate than the toe of the plow, and the angular relation of the plow body would, therefore, be changed and the suction of the plow therefore accordingly varied. This is obviated, however, in my construction, as when the plow beam is swung downward the connecting rod 24 pulls forward upon the arm 26 of the bell crank, which thus causes the arm 29 of this bell crank to push downward upon the forward end of the curved member 21 which carries the plow body, and in this manner maintains this plow body in the same angular relation to the ground line. It will further be noticed that the greater part of the weight and suction of the plow is removed from the connecting rod 24 and is carried by the gage wheel 34. This is accomplished by the fact that the entire weight and suction of the plow body is carried by the members 18 and 19 and by the arm 29 of the bell crank which bears against the arm 43 carried by the casting 31, as the link 30 is pivoted about midway of the arm of the bell crank 26, and by this construction the downward suction is carried on the pivot of the bell crank 26 and the arm 43. This relieves a large amount of strain from the rod 24. This rod 24 is threaded at one end with a right hand thread and at the other end with a left hand thread, and by turning this rod in either direction the suction can be increased or decreased, as desired. With this arrangement, it will be noticed that as the plow is drawn over the ground and the gage wheel rides in and out of the depressions, the plow body is likewise raised and lowered, but is all the time maintained in the same angular relationship through the ground, and thus always maintains the same degree of suction.

While I have shown and described one embodiment of my invention, it will be understood, of course, that I do not wish to be limited to the exact construction shown and described.

What I claim as my invention is:

1. In a gang plow, a main frame, a plow beam pivotally mounted at its forward end in said frame, a gage-wheel adapted to travel along the surface of the ground, a plow body carried by said plow beam and adapted to be raised or lowered corresponding to similar movements of said gage-wheel, and means for maintaining said plow body in the same angular relation during such movement.

2. In a gang plow, a main frame, a plow beam pivotally connected at its forward end to said frame, a plow standard pivotally connected to the rear end of said plow beam, a plow body carried by said standard, means for raising and lowering said plow beam, and means acting on said pivoted plow standard for maintaining the heel and toe of said plow body in the same angular relationship to ground line during the raising and lowering of said plow beam.

3. In a gang plow, a main frame, a plow beam pivotally mounted at its forward end in said main frame, a plow standard pivotally connected at the rear end of said plow beam, a plow body carried by said standard, a connecting rod extending substantially parallel to said first-mentioned beam and pivotally connected at its forward end to said main frame and at its rear end to said plow standard, whereby when said plow beam is raised and lowered said plow is always maintained in the same angular position.

4. In a gang plow, a main frame, a plow beam pivotally connected at its forward end to said frame, a connecting rod pivotally connected at its forward end to said main frame, a bell crank carried by said plow beam and having one end connected to the rear end of said connecting rod, a plow body carried by said plow beam, and connections from the other arm of said bell crank to said plow body, whereby said plow body is maintained in the same angular position when said plow beam is raised and lowered.

5. In a gang plow, a main frame, a plow beam pivotally connected at its forward end to said main frame, a plow supporting member pivotally connected to the rear end of said plow beam, a plow body carried by said second beam, a connecting rod connected at its forward end to said main frame, a bell crank carried by said first plow beam and having one arm connected to said connecting rod, and a link connection between the other end of said bell crank and said supporting member, whereby said plow body is maintained in the same angular position when said plow beam is raised and lowered.

6. In a gang plow, a main frame, a plow beam pivotally connected at its forward end to said frame, a gage-wheel pivotally connected to said plow beam and adapted to follow the irregularities in the ground, a plow body carried by said plow beam, means for raising and lowering said plow beam with respect to said gage-wheel, a support carried by the gage-wheel for supporting the plow beam in definite relation to the gage wheel, and means for maintaining the plow body in the same angular position while said beam is being raised and lowered and when it rises and falls by means of the movement of said gage-wheel.

7. In a gang plow, a main frame, a plow beam pivotally mounted in said frame, a plow body carried by said beam, a gage-wheel, connections from said plow body to said gage-wheel, whereby the weight and suction of said plow body is carried by said wheel, means whereby vertical movement of said gage-wheel produces a corresponding movement in said plow body, and means for maintaining the same degree of angularity of said plow body during said vertical movement.

8. In a gang plow, a main frame, a plow beam pivotally mounted in said frame, a plow body pivotally carried by said plow beam, a gage-wheel pivotally connected to said plow beam, a connection from said plow body to said gage-wheel, whereby the weight and suction of said plow body are carried by said gage-wheel, means for raising and lowering said plow beam and body with respect to said gage-wheel, and a link pivotally connected to the frame and to the plow body for maintaining the same angular position of said plow body during such movement.

9. In a gang plow, a main frame, a plow beam pivotally mounted in said frame, a plow body carried by said plow beam, a gage-wheel pivotally connected to said plow beam, a connection from said plow body to said gage-wheel, whereby the weight and suction of said plow body are carried by said gage-wheel, means for raising and lowering said plow beam and body with respect to said gage-wheel, means whereby vertical movement of said gage-wheel produces a correspondingly vertical movement in said plow body, and means for maintaining the same angular position of said plow during such vertical movement.

10. In a gang plow, a main frame, a plow beam mounted therein, a plow body carried by said plow beam, a gage-wheel carried by said plow beam, means for adjusting the operating position of said plow body with respect to said gage-wheel, an operating lever, and a toggle connected between the lever and the gage-wheel for raising said plow body with respect to said gage-wheel, and for locking said plow body in raised position.

11. In a gang plow, a main frame, a plow beam pivotally mounted at its forward end in said frame, a gage-wheel adapted to travel along the surface of the ground, a plow body carried by said plow beam and adapted to be raised or lowered corresponding to similar movements of said gage-wheel, means for maintaining said plow body in the same angular relation during such movement, and means for adjusting the vertical position of said plow body with respect to said wheel.

12. In a gang plow, a main frame, a plow beam pivotally connected at its forward end to said frame, a plow standard pivotally connected to the rear end of said plow beam, a plow body carried by said standard, means for raising and lowering said plow beam, means for actuating the plow standard relatively to the beam for maintaining the heel and toe of said plow body in the same angular relationship to each other during the raising and lowering of said plow beam, and means for adjusting said plow body in a vertical plane.

13. In a gang plow, a main frame, a plow beam pivotally connected at its forward end to said frame, a connecting rod pivotally connected at its forward end to said main frame, a bell crank carried by said plow beam and having one end connected to the rear end of said connecting rod, a plow body carried by said plow beam, connections from the other arm of said bell crank to said plow body, whereby said plow body is maintained in the same angular position when said plow beam is raised and lowered, and means for adjusting said plow body in a vertical plane.

14. In a gang plow, a main frame, a plow beam pivotally mounted in said frame, a plow body carried by said beam, a gage-wheel, connections from said plow body to said gage-wheel, whereby the weight and suction of said plow body is carried by said wheel, means whereby vertical movement of said gage-wheel produces a corresponding movement in said plow body, means for maintaining the same degree of angularity of said plow body during said vertical movement, and a screw for adjusting the position of said plow body with respect to said wheel.

15. In a gang plow, a main frame, a plow beam pivotally mounted on said frame, a plow body carried by said plow beam, a casting pivotally mounted on said beam, a gage-wheel mounted in said casting, an arm pivotally mounted on said casting, a second arm connected with said plow body and having an end portion adapted to engage with said first-mentioned arm, and means for adjusting the position of said first arm to thereby adjust the vertical position of said plow body with respect to said gage-wheel.

Signed by me at Rock Island, Illinois, this 29th day of October, 1912.

EDWARD M. HEYLMAN.

Witnesses:
H. DETJENS,
F. E. MAUCKER,

Copies of this patent may be obtained for five cents each, by addressing the "Commissioner of Patents, Washington, D. C."